United States Patent
Cances et al.

(10) Patent No.: US 9,533,275 B2
(45) Date of Patent: Jan. 3, 2017

(54) PROCESS AND APPARATUS FOR ENDOTHERMIC REACTIONS

(71) Applicant: L'AIR LIQUIDE Société Anonyme pour l'Etude et l'Exploitation des Procédés Georges Claude, Paris (FR)

(72) Inventors: Julien Cances, Nantes (FR); Frederic Camy-Peyret, Paris (FR); Bernard Labegorre, Paris (FR)

(73) Assignee: L'Air Liquide Société Anonyme Pour L'Étude Et L'Exploitation Des Procedes Georges Claude, Paris (FR)

( * ) Notice: Subject to any disclaimer, the term of this patent is extended or adjusted under 35 U.S.C. 154(b) by 16 days.

(21) Appl. No.: 14/426,027

(22) PCT Filed: Aug. 14, 2013

(86) PCT No.: PCT/EP2013/066998
§ 371 (c)(1),
(2) Date: Mar. 4, 2015

(87) PCT Pub. No.: WO2014/040815
PCT Pub. Date: Mar. 20, 2014

(65) Prior Publication Data
US 2015/0217250 A1 Aug. 6, 2015

(30) Foreign Application Priority Data
Sep. 13, 2012 (EP) .................................... 12184303

(51) Int. Cl.
*F23C 5/08* (2006.01)
*F23C 13/00* (2006.01)
(Continued)

(52) U.S. Cl.
CPC ................. *B01J 8/062* (2013.01); *B01J 8/067* (2013.01); *C01B 3/384* (2013.01); *F23C 5/08* (2013.01);
(Continued)

(58) Field of Classification Search
CPC ............... C01B 2203/1241; C01B 2203/0233; C01B 3/384; C01B 2203/0816; F23C 5/08; F23C 2900/03002; F23C 13/00; F27D 1/00; F27D 7/02; B01J 8/062; B01J 8/067
See application file for complete search history.

(56) References Cited

U.S. PATENT DOCUMENTS

| | | | |
|---|---|---|---|
| 2007/0099141 A1* | 5/2007 | Joshi | B01J 8/062 431/354 |
| 2007/0128091 A1 | 6/2007 | Gorval | |
| 2012/0126177 A1 | 5/2012 | Meissner et al. | |

FOREIGN PATENT DOCUMENTS

| | | |
|---|---|---|
| EP | 2369229 | 9/2011 |
| WO | 2005018793 | 3/2005 |

OTHER PUBLICATIONS

International Search Report and Written Opinion from PCT/EP2013/066998, corresponding to this case, mailed Sep. 24, 2013, 10 pages.

(Continued)

*Primary Examiner* — Stanley Silverman
*Assistant Examiner* — Syed Iqbal
(74) *Attorney, Agent, or Firm* — Justin K. Murray

(57) ABSTRACT

A furnace for performing an endothermic process comprises tubes containing a catalyst for converting a gaseous feed, said tubes positioned inside the furnace, inner burners mounted to a furnace roof between the tubes, and outer burners mounted to the furnace roof between the tubes and a furnace wall. The outer burners are positioned close to the (Continued)

furnace wall, and configured to operate with 45-60% of the power of the inner burners and with an inlet velocity between 90 to 110% of the inlet velocity of the inner burners.

15 Claims, 8 Drawing Sheets

(51) Int. Cl.
    *B01J 8/06*         (2006.01)
    *C01B 3/38*         (2006.01)
    *F27D 1/00*         (2006.01)
    *F27D 7/02*         (2006.01)

(52) U.S. Cl.
    CPC .............. *F23C 13/00* (2013.01); *F27D 1/00* (2013.01); *F27D 7/02* (2013.01); *C01B 2203/0233* (2013.01); *C01B 2203/0816* (2013.01); *C01B 2203/1241* (2013.01); *F23C 2900/03002* (2013.01)

(56) References Cited

OTHER PUBLICATIONS

International Preliminary Report on Patentability for PCT/EP2013/066998, mailed Mar. 26, 2015, 8 pages.

\* cited by examiner

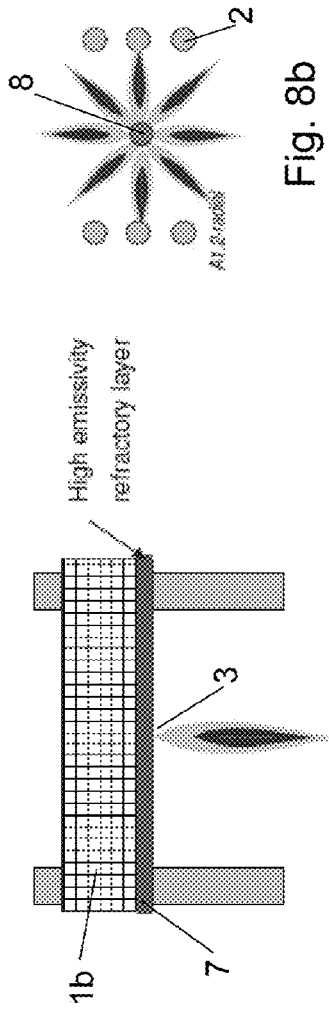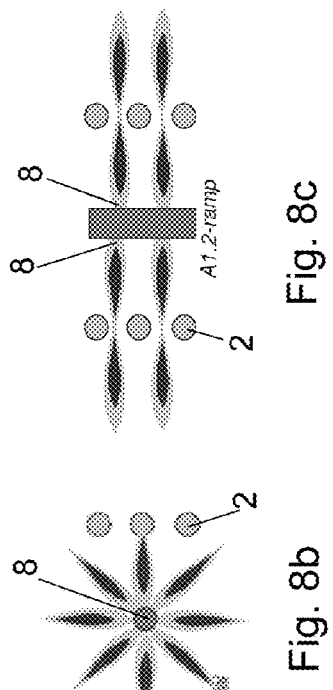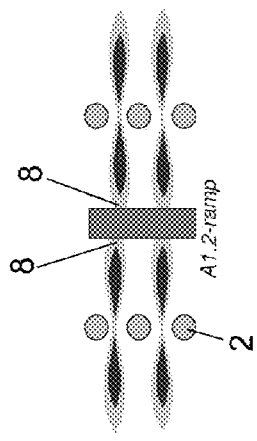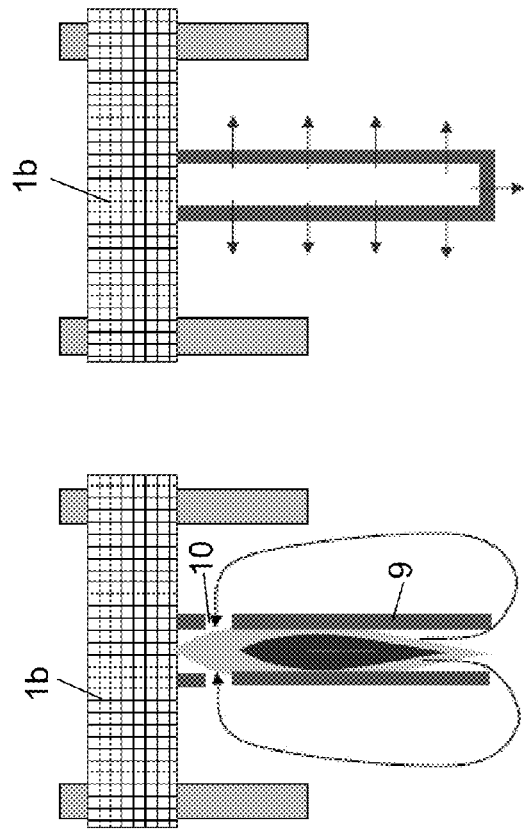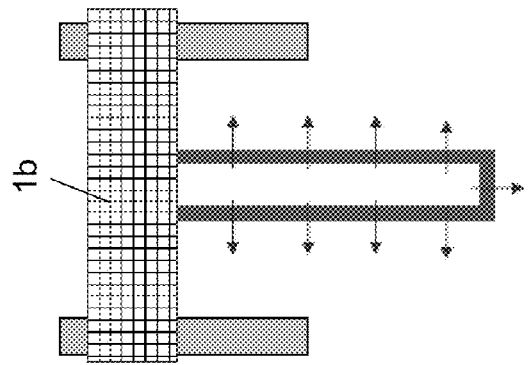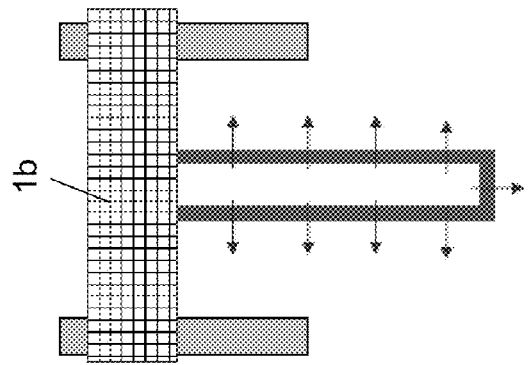

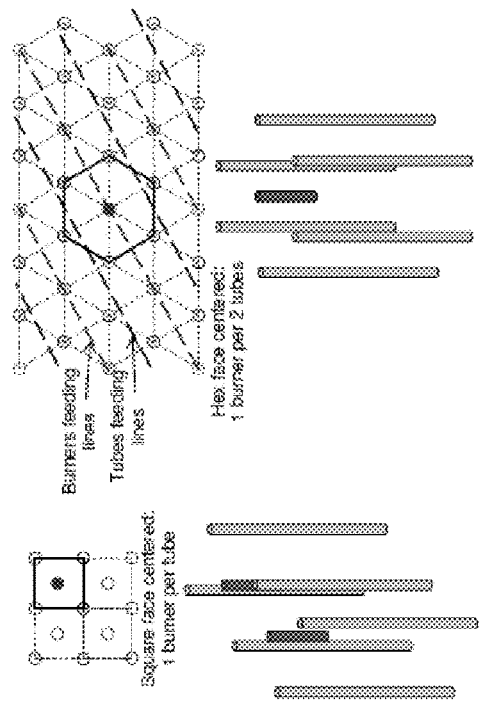
Fig. 11a
Fig. 11b
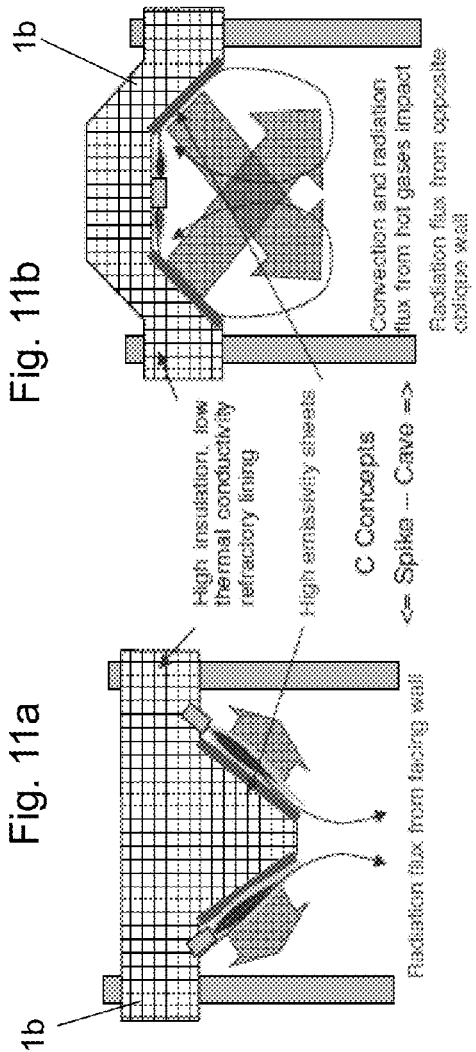
Fig. 12a
Fig. 12b

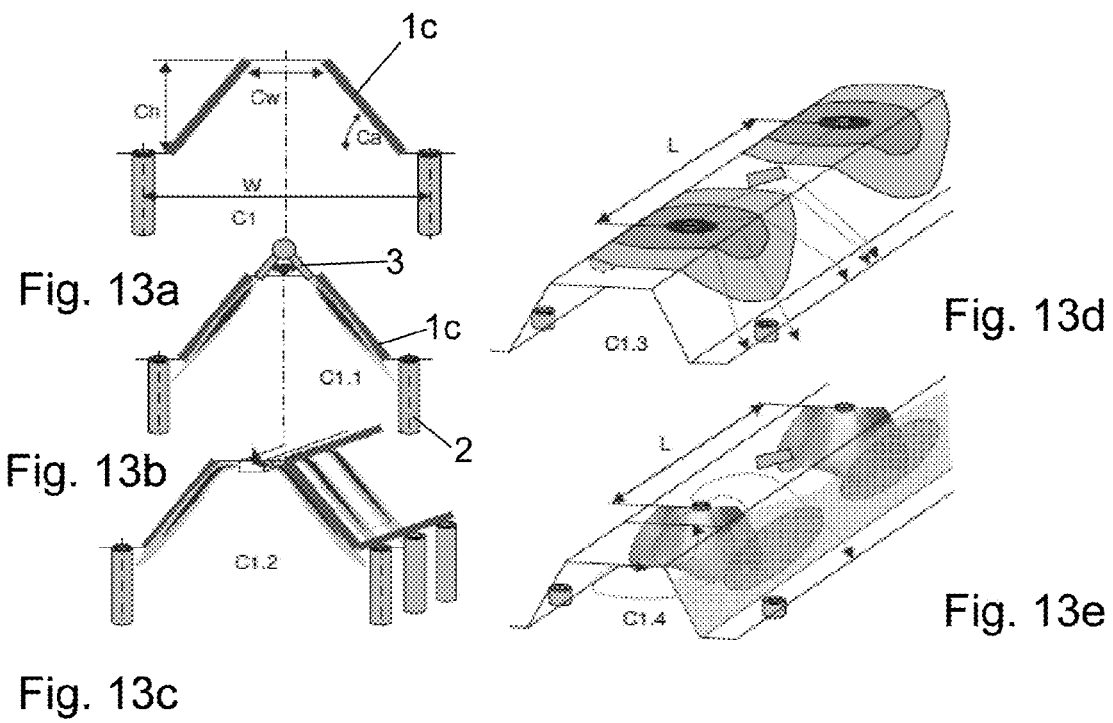
Fig. 13a
Fig. 13b
Fig. 13c
Fig. 13d
Fig. 13e
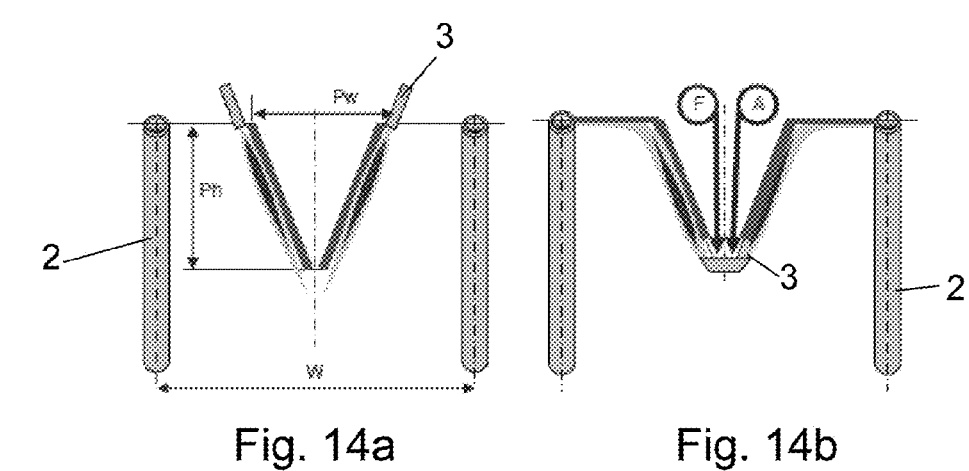
Fig. 14a
Fig. 14b

PROCESS AND APPARATUS FOR ENDOTHERMIC REACTIONS

CROSS-REFERENCE TO RELATED APPLICATIONS

This application is a national stage application under 35 U.S.C. 371 of International Patent Application Serial No. PCT/EP2013/066998, entitled "PROCESS AND APPARATUS FOR ENDOTHERMIC REACTIONS" filed Aug. 14, 2013, which claims priority from EP 12 184 303.1 filed Sep. 13, 2012, the disclosures of which are hereby incorporated by reference herein in their entirety.

FIELD OF THE INVENTION

The present invention deals with the design of top-fired furnaces for steam methane reforming (SMR) and other endothermic reactions in externally fired reactors.

BACKGROUND

The SMR process is mainly based on the reforming reaction of light hydrocarbons such as methane that yields to a mixture of hydrogen ($H_2$) and carbon monoxide (CO) in the presence of water vapor. The reaction is endothermic and slow and requires additional heat input, as well as a catalyst to occur. The SMR reactor usually comprises several tubes placed in a furnace, said tubes filled with catalyst pellets and fed with the process gas mixture of methane and steam.

Several types of furnace designs are encountered industry wide. The top-fired technology is one of the most referenced designs and it is proposed by several technology providers. Top-fired furnaces are typically made of a refractory lined firebox containing several rows of catalyst containing tubes. Roof burners are placed in rows in-between the tube rows and the combustion products out of the burners are usually blown vertically downwards, so that the tube rows face the flames in their upper part. A flue gases exhaust collector is usually provided at the furnace floor level.

The main objective of the furnace design, often also called firebox design, is to maximize the heat transferred from the burner flames to the tubes while respecting a tube maximal operating temperature constraint that is a function of the tube mechanical load (mainly feed gas pressure), the mechanical properties of the alloys used for the tubes and the desired lifetime of the tubes. Indeed, any intensification of the heat transferred to the tubes has a direct positive impact, either on the furnace productivity or on the compactness of the firebox which is valuable in terms of capital expenditures. However, intensification of the heat duty is usually implying higher tube skin temperature levels that reduce tube lifetime or require more resistant alloys, which are much more expensive.

The temperature profiles of the catalyst tubes are therefore a critical element of the furnace design and operation, at the focal point of the compromise between performance and durability. The typical vertical profiles for tube heat flux and temperature is plotted in FIG. 2 in circumferential average. The heat flux profile clearly highlights that the feed inlet (upper) part of the tube is a zone for heat transfer. Indeed, several factors favor the maximization of the heat flux:

Vicinity of the burners and feed inlet point, implying a maximum temperature difference between the load (tubes) and the heat release source (burners)

Highest reaction rates and thus heat sink that pull tube temperatures down

This underlines the superiority of the top-fired design compared to others with regard to heat transfer efficiency.

The stiffer the heat flux and temperature profile is in the upper part of the tube, the higher is the heat duty to the tube at same (creep resistance) design temperature, and thus the higher the process gas flow rate capacity per tube at the same conversion rate. The actual top-fired design to increase the heat transfer in the upper part of the furnace is however limited to the capacity of gaseous flames produced by conventional burners used in the furnaces to transfer the chemical energy to the tubes from the radiation of hot gases. Indeed, several phenomena limit the ability of conventional down-fired burners:

High nitrogen oxide ($NO_x$) levels are heavily penalizing short flames burner selection for environmental reasons, whereas a typical means to reduce thermal $NO_x$ emissions is to dilute the flame with burnt gases, or to stage the fuel injections so that the flame maximum temperature is reduced below 1000° C. As a result, the flame's capability to transfer heat in the upper part of the furnace and, therefore, the heat provided for the reaction is reduced. This constraint is a typical compromise between longer and colder flames and shorter, less $NO_x$ efficient ones.

The physics of radiation heat transfer between gaseous media and walls is intrinsically less efficient than the ones between wall surfaces of different temperatures. The 1 m characteristic dimension volume of hot gases has typical net emission largely below the one of high emissivity solid surface heated at the same temperature.

Furthermore, in top-fired reformers the necessary heat for the endothermic reaction to occur is provided by burners located between the tubes. Additional burners at the furnace side, along the walls of the furnace are only heating one tube row on one side and the refractory wall on the other side. The burners in the middle of the firebox are heating two tube rows on both sides of the burner row. Therefore, the required power of the side burners is smaller (~52% including heat losses at side wall) than the one in the center of the furnace. Reducing the power injected at the side burner rows, while keeping the stoichiometry constant, implies to reduce the air and fuel flow rates.

The fluid mechanism and jets theory will define the typical flow arrangement within a top-fired firebox, meaning the side burners hot burnt gases jets aspiration towards the middle center of the firebox. The jet flame entrains part of the surrounding flue gas, creating a depression, and consequently a flue gas recirculation. Therefore the burners located along the walls are submitted to a smaller recirculation (i.e. depression) on the wall side than on the furnace side, due to the presence of the next burner row. If the lower power or flow rates along the side walls yields to a lower velocity, this will reinforce the bending effect of the side flames to the center, due to the weaker momentum of the side jets, as illustrated in FIG. 3.

In US 2007/0099141 A1 a method and furnace for generating straightened flames in a furnace are proposed, wherein an oxidant is introduced into a plurality of oxidant conduits. Each of the oxidant conduits has an outlet in fluid communication with a furnace interior proximate a first interior end of the furnace. The first interior end of the furnace has a horizontally projected area. The oxidant conduit outlets define a combined horizontally projected turbulent free jet area at 30% of the average distance from the first interior end of the furnace to a second interior end of the furnace provided opposite the first interior end.

Document US 2007/0128091 discusses a furnace chamber surrounded by a circumferential furnace wall, in which a plurality of burners disposed essentially in one plane, with burner exit direction directed downward and a plurality of reaction tubes disposed essentially vertically and parallel to one another are disposed, whereby the reaction tubes are heated from the outside by means of firing burners. It is intended to improve the heat distribution and the entire heat transfer. This is achieved by disposing at least the outer burners in the region of the furnace wall with a burner exit direction which is inclined relative to the vertical, leading away from the center of the furnace.

Document EP 2 369 229 A2 describes a reformer and a method for operating this reformer including the combustion of fuel in a combustion region of an up-fired or down-fired reformer, wherein at least one of the burners is a wall-bound burner forming a nonuniform injection. The non-uniform injection properties generate a heat profile providing a first heat density proximal to a wall and a second heat density distal from the wall, wherein the second heat density is greater than the first heat density. The non-uniform injection properties are formed by selecting an angle of one or more injectors, a flow rate of one or more injectors, an amount and/or location of oxidant injectors, an amount and/or location of fuel injectors, and combinations thereof.

The article "*Fluegas flow patterns in top-fired steam reforming furnaces*" of W. Cotton, published in 2003 by Johnson Matthey, teaches that reformers comprising outer burners firing with a rate of 70% compared to the inner burners and an outer lane between the tubes and the furnace side that has 70% of the width of the inner lanes between two tube rows reduce the recirculating problem. According to the article it is also possible to operate with 100% rated outer burners firing into an outer lane having the same width as the inner lanes without any bending of the flames to the center of the furnace.

All proposed solutions have in common, that they do not enable a furnace design, which provides outer burners with only the required amount of power. As presented e.g. in the cited article "*Fluegas flow patterns in top-fired steam reforming furnaces*", the burner power rate is not reduced to the calculated value of about 52%. Therefore, the known solutions avoid the flame bending to the furnace's center but do not prevent an overheating of the catalyst containing tubes situated close to the furnace walls. Such an overheating leads to unwanted side reactions and an irreversible damage of the catalyst.

Therefore, it is the object of the present invention to propose a furnace and a method to operate this furnace which will avoid the bending effect of the side flames to the center as well as the problem of overheating the tubes close to the walls of the furnace.

SUMMARY

This task is accomplished by the features as described herein. The furnace for performing an endothermic process comprises a number of catalyst containing tubes, which are arranged inside the furnace, typically in rows. Inside these catalysts tubes, a gaseous feed (educt) is converted in a reaction absorbing energy from the surroundings in the form of heat. This heat is provided by a number of burners, which are positioned on top of the furnace. Parts of the burners are so called "inner burners" and positioned between the tube rows, while the so called "outer burners" are disposed between the outermost tubes and the furnace wall. The burner exit direction is directed downward. The catalyst tubes are disposed essentially vertically and parallel to one another, wherein the feed flows through the tubes from the top to the bottom.

To avoid the flame to bend and the overheating of the tubes, three different modifications of the current design are proposed:

The outer or side burners are positioned close to the wall so that their flames are sticked to the refractory. This will avoid the flames to bend towards the middle of the furnace because of the so called "jet wall" effect which enables the flame to flow away from the wall. Close to the wall in the sense of the presence invention means that the stream issued from the burner nozzle is directly flowing along the wall. The burner is placed as close as possible to wall, even touching it. This can mean that the distance of the central axis of the burner to the furnace wall is less than 25%, such as 10%, such as 5%, such as 2% of the distance between the outermost tubes and the furnace wall. In most cases, the side burners will not be circular, but of flat rectangular shape.

The power of the outer or side burners is designed to a value between 45 and 60%, such as 50 to 55% of the power of the inner burners. This will avoid tube overheating on the second tube row as explained above. The power is adjusted by the amount of the burned fuel.

The outer burners are dimensioned so that their jet inlet velocity is essentially the same as in the inner burners. Deviations of max. 10%, such as 5% are possible. This will allow the flow arrangement to be smoother and the stream lines to be straighter down. The burner feed inlet velocity is adjusted by the overall volume flow through the burner nozzle.

In an embodiment of the invention, the tubes are arranged in rows. According to the invention a row is an arrangement of at least two, such as at least three burners on a straight line or an arrangement of burners having the same distance to the center of the furnace (like rings around the center of a circle).

The ratio of the distance between the furnace side wall and the first tube row to the gap between two subsequent tube rows is set to the same value as the ratio between the power of the outer and inner burners. This will allow a constant average velocity to be maintained across the firebox. This should avoid flow perturbation due to the differential velocities from different regions of the furnace.

Furthermore, the idea of the invention to generate a homogeneous temperature profile for the furnace is achieved even better if a so called "high emissivity solid surface" is used. To that effect at least parts of the walls are provided with a high temperature resistant, high emissivity solid surface. The radiating surfaces are arranged so that they extract much heat from the flames through radiative and convective exchange to have a higher surface temperature and so that they emit in return high radiation flux towards the upper part of the tubes, said tubes being at relatively low temperatures compared to the radiating surfaces.

High emissivity refractory bricks, or thin sheets or coated layer are disposed on the furnace roof surface and upper part of the side walls, the high emissivity being either from intrinsic material properties, for instance using silicon carbide sheets, or from surface treatment or texturing, for instance using ceramic foam sheets, such as made of aluminum oxide or silicon oxide.

Particular good results are achieved if at least a part of the burners are so called "jet flame burners". So called "jet flames" are characterized by an initial velocity profile of a flame resembling that of fully developed pipe flow. The flame brush is mostly confined within the mixing layer of the jet. The flames are very oblique to the incident flow and look thinner and tall.

Also the design of at least some of the burners as so called "burners with high swirl ball flame technology" leads to a very homogenous temperature profile through the furnace. High swirl promotes the formation of a recirculation zone and is the essential mechanism for flame stabilization. Swirling flows can be produced either by tangential jet injections or by vane swirlers. The flame is anchored by the hot products trapped inside the recirculation zone. The swirl rate expressed in terms of a swirl number dictates the size and strength of the recirculation zone in most of the flame properties.

The implementation of the flame inside of a porous radiating shell enclosure leads to a more homogenous temperature profile of the flame itself. The radiating shell is made of high temperature resistant material such as porous ceramic foam with high emissivity (silicon carbide, aluminum oxide and silicon oxide). The use of radiant burners allows designing the furnace with optimized burner tube to tube pavement that minimizes circumferential flux un-homogeneities. The most interesting pavements are a square or a hexahedral configuration of the burner with regard to the catalyst tubes.

The square pavement is advantageous for heat flux homogeneity and allows simpler manifold design for the distribution of the fluids (combustion air, fuel and feed); it requires however greater burner density per tube.

The hexahedral pavement is optimal from the viewpoint of heat flux distribution and burner numbers limitation but requires a slight additional complexity in the fluid distribution and collection systems design. The radiant shell length is to be adapted based on the pavement and the tube diameter, advantageously between 10 and 40% of the tube length, optimal between 20 and 33% of the tube length.

In an embodiment, the furnace roof design is such that the high temperature, high emissivity surfaces have their respective normal directed towards the tubes. The corresponding emitting surfaces can advantageously be considered either protruding in a convex shape into the combustion chamber or on the contrary are recessed in a concave form. High emissivity refractory sheets may be disposed in the flame heated region. For the convex form, the simplest implementation is based on wall burners with downwards-fired jet flames around the convex bulge with downwards-fired flames. A more complex configuration provides that the flames are fired upwards from the spike end of the convex bulge to increase the radiating area covered by the flames and thus the transfer efficiency to the tubes.

The invention also covers a process for operating a furnace as described above. A gaseous educt is fed through catalyst containing tubes to perform an endothermic process. The catalyst tubes are positioned inside the furnace and are heated by inner burners placed on top of the furnace between the tubes and by outer burners placed on top of the furnace between the outermost tubes and the furnace wall. By placing the outer burners next to the wall, operating these outer burners with 45 to 60%, such as 50 to 55% of the power of the inner burners and with essentially the same inlet velocity as the inner burners it is possible to generate a homogenous temperature profile in the catalyst tubes. The inlet velocity of the outer burners is adjusted to be between 90 and 110%, such as 95 to 105%, of the inlet velocity of the inner burners, so that there is a maximum deviation of 10%, such as 5%, between the inlet velocities.

In various embodiments, at least some of the burners' flames are directed from the top to the bottom of the furnace to avoid any local heating phenomena.

Even better results are achieved if the educt flows through the vertical catalyst tubes from the top to the bottom of the furnace, wherein most of the educt is converted already in the entrance zone at the top of the furnace since there is the hottest point of the burners' flames.

To achieve the same inlet velocity in the inner burners as in the outer burners, it was found that advantageously the inlet velocity is adjusted by air injection. Using air for adapting the inlet flow, the burning reaction in the burner is almost un-influenced. Furthermore, air is of course the cheapest gas.

The process leads to particular good results if the process is a steam reforming process.

In an embodiment, a furnace for performing an endothermic process comprising tubes containing a catalyst for converting a gaseous feed, wherein said tubes are positioned in inside the furnace, inner burners mounted to a furnace roof between the tubes, and outer burners mounted to the furnace roof between the tubes and a furnace wall, wherein the outer burners are positioned close to the furnace wall, that the outer burners are configured to operate with 45-60% of the power of the inner burners and with an inlet velocity between 90 to 110% of the inlet velocity of the inner burners, is provided.

In an embodiment, that the tubes are positioned in rows and that the ratio of the distance between the furnace wall and the first tube row to the gap between two adjacent tube rows corresponds to the ratio between the power of the outer and the power of the inner burners.

In an embodiment, at least a part of the furnace roof is provided with a temperature resistant, high emissivity solid surface.

In an embodiment, the high emissivity solid surface contains silicon carbide or ceramic porous foams.

In an embodiment, some of the burners are jet flame burners.

In an embodiment, at least some of the burners are burners with high swirl ball flame technology.

In an embodiment, at least some of the burners are arranged such that the flame is formed on a porous radiating shield.

In an embodiment, at least some of the burners are arranged in a square or a hexahedral configuration with regard to the catalyst tubes.

In an embodiment, the length of radiating shield is between 10 and 40% of the catalyst containing tube length.

In an embodiment, at least a part of the furnace roof is designed to have a convex or concave shape.

In an embodiment, a process for operating a furnace for performing an endothermic process with catalyst containing tubes positioned in inside the furnace for converting a gaseous feed and which are heated by inner burners mounted to a furnace roof between the tubes and by outer burners mounted to the furnace roof between the tubes and a furnace wall, wherein the outer burners are positioned close to the furnace wall, that the outer burners are operated with 45-60% of the power of the inner burners and that an inlet velocity of the outer burners is adjusted to be between 90 and 110% of the inlet velocity of the inner burners, is provided.

In an embodiment, at least some of the burners' flames are directed from the top to the bottom of the furnace.

In an embodiment, the feed flows through the vertically arranged catalyst tubes from the top to the bottom of the furnace.

In an embodiment, the inlet velocity is adjusted by air injection.

In an embodiment, the endothermic process is a steam reforming process.

The invention will now be described in more detail on the basis of embodiments and the drawings. All features described or illustrated form the subject matter of the invention independent of their combination in the claims or their back reference.

BRIEF DESCRIPTION OF THE FIGURES

In the drawings:

FIG. 8 shows the implementation of a burner in combination with a high emissivity refractory layer;

FIG. 9 shows the high swirl flame concept;

FIG. 10 shows the radiant burner concept for diffusion flame and premix;

FIG. 11 shows the radiant burner to tube arrangement;

FIG. 12 shows the implementation of the furnace roof as radiant wall;

FIG. 13 shows options for configurations of a concave roof;

FIG. 14 shows options for configurations with a convex roof;

DETAILED DESCRIPTION

Figure 1:
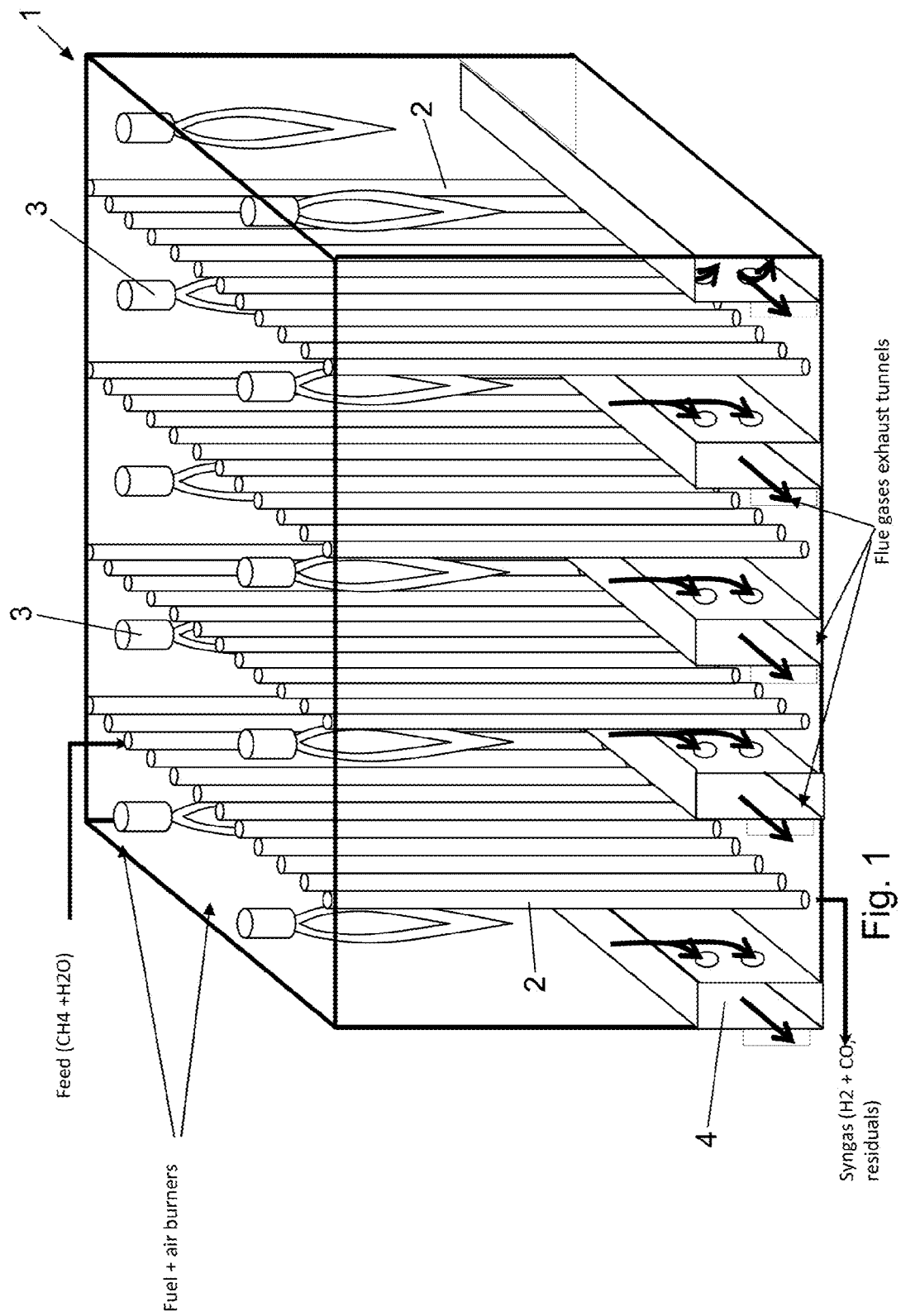
FIG. 1 shows the typical design of a furnace before an endothermic reaction in catalyst containing tubes.

FIG. 1 shows a typical arrangement of a top-fired furnace 1 used to obtain a synthesis gas from a feed (educt) comprising, e.g., methane and steam. Catalyst tubes 2 are provided in several rows within the furnace 1. The feed is supplied through tubes 2 from the top to the bottom from where the resulting product, e.g., a synthesis gas comprising hydrogen, carbon monoxide and residuals, is withdrawn. Between the tube rows, burners 3 fire vertically downwards from the top. The resulting flue gases are withdrawn through exhaust tunnels 4.

Figure 2:
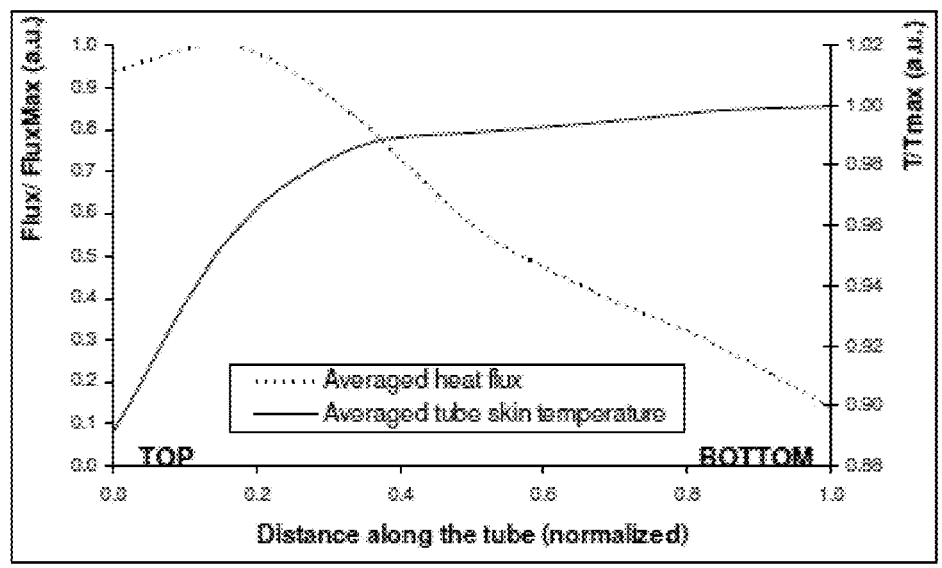
FIG. 2 shows the typical vertical tube heat flux and temperature profile.

The typical vertical profiles for heat flux and temperature are plotted in FIG. 2. It is evident that the heat flux and the temperature profile are coupled to each other. The stiffer the heat flux and the temperature profile is in the upper part of the tube, the higher is the heat duty to the tube at the same temperature and the higher is the process gas flow rate capacity per tube at the same conversion rate.

Figure 3:
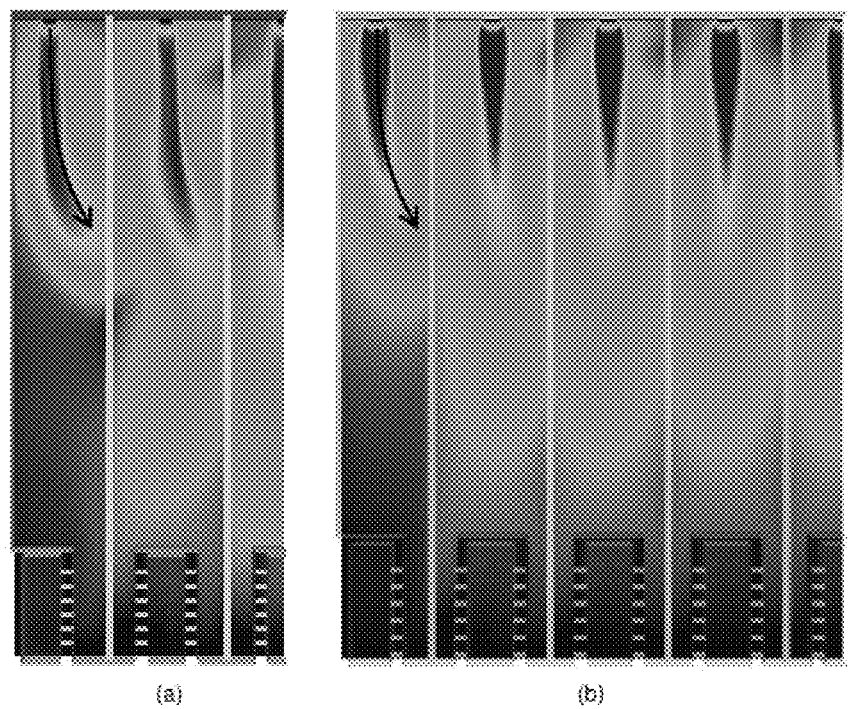
FIG. 3 shows an illustration of the flame bending.

FIG. 3 is an illustration of the flame bending for 4 and 8 tube rows (only half of the firebox has been simulated for symmetry reasons). The fluid mechanism and jets theory will define the typical flow arrangement within a top-fired firebox, meaning the side burners hot burnt gases jet aspiration towards the middle center of the firebox. If the lower power or flow rates along the side walls yields to a lower velocity, this will reinforce the bending effect of the side flames to the center, due to the weaker momentum of the side jets.

Figure 4:
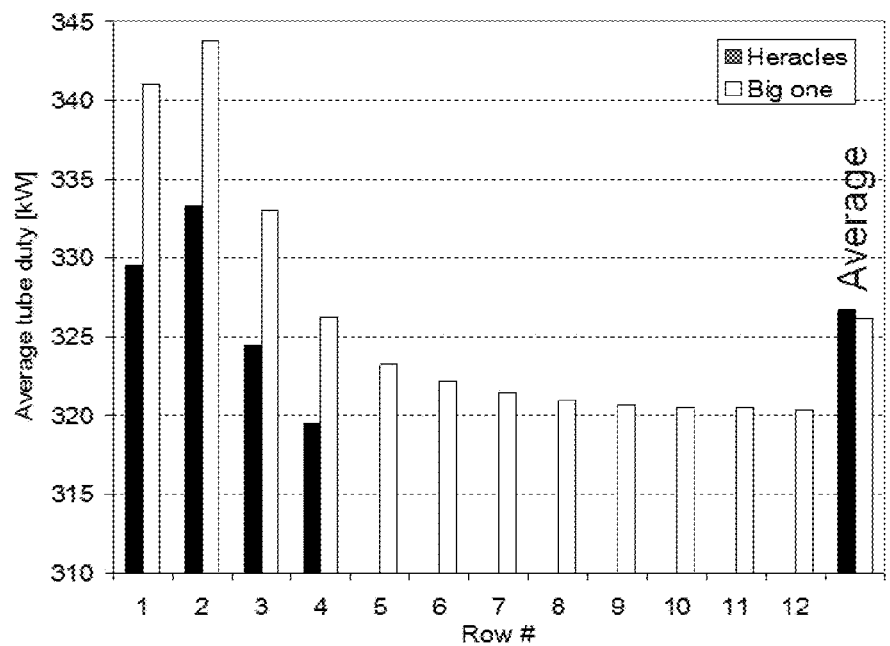
FIG. 4 shows the average tube duty row per row for a reformer furnace (8 tube rows) and a virtual 24 tube rows firebox.

FIG. 4 shows the simulated average tube duty per row for a reformer (furnace) having a firebox with 24 tube rows (only half of the firebox has been simulated for symmetry reasons). To counter the phenomenon of the bending effect, the momentum from the side burner rows has been increased step by step, up to 78% of the inner burner power. The flame bending is not suppressed, and the power increase creates an overheated region at the side of the furnace, whose peak value is located on the second tube row from the wall due to the hot flue gas flowing through the first tube row and heating the next row.

Figure 5:
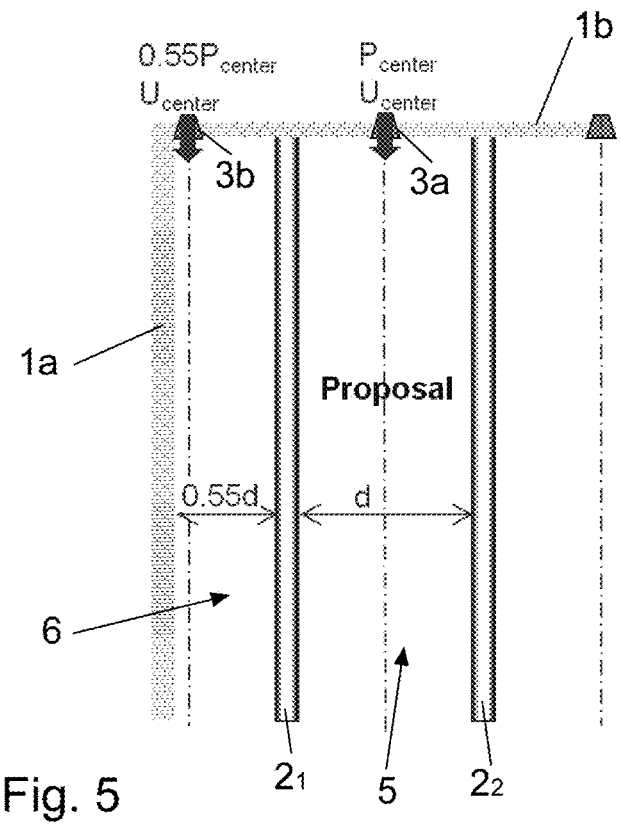
FIG. 5 schematically shows the section of the furnace including the proposed design.

FIG. 5 shows the design modification as proposed with the present invention, wherein two channels 5, 6 are defined by the furnace wall 1a and the catalyst tubes 2. The distance d between two catalyst tube rows $2_1$ and $2_2$ defines the middle channel 5. Inner burners 3a are centrally positioned between tubes $2_1$ and $2_2$ on the roof 1b of the furnace 1. In channel 6 defined between the outer catalyst tube $2_1$ and the furnace wall 1a outer or side burners 3b are arranged on the roof 1b of the furnace. The dimension $d_1$ of outer channel 6 is set so that its ratio to the distance d is the same as the ratio of the power of the outer and the inner burners, namely 45 to 60%, such as 50 to 58%, and such as approximately 55% of the diameter d.

Figure 6:
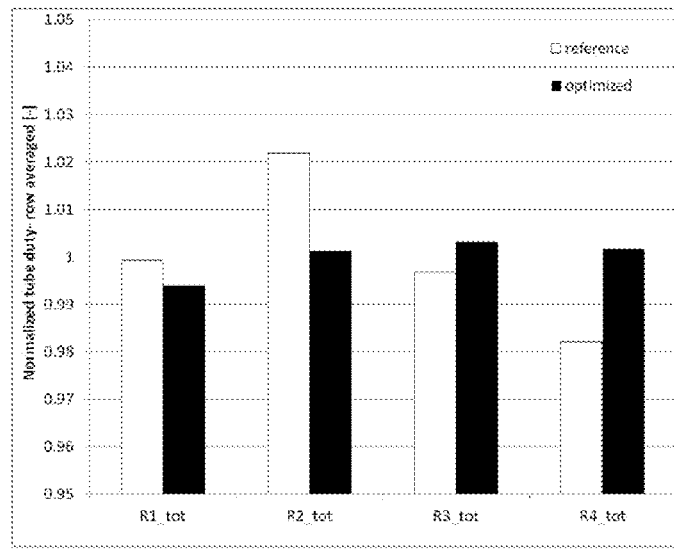
FIG. 6 shows the normalized tube duty row per row average for reference and optimized reformer design.
Figure 7:
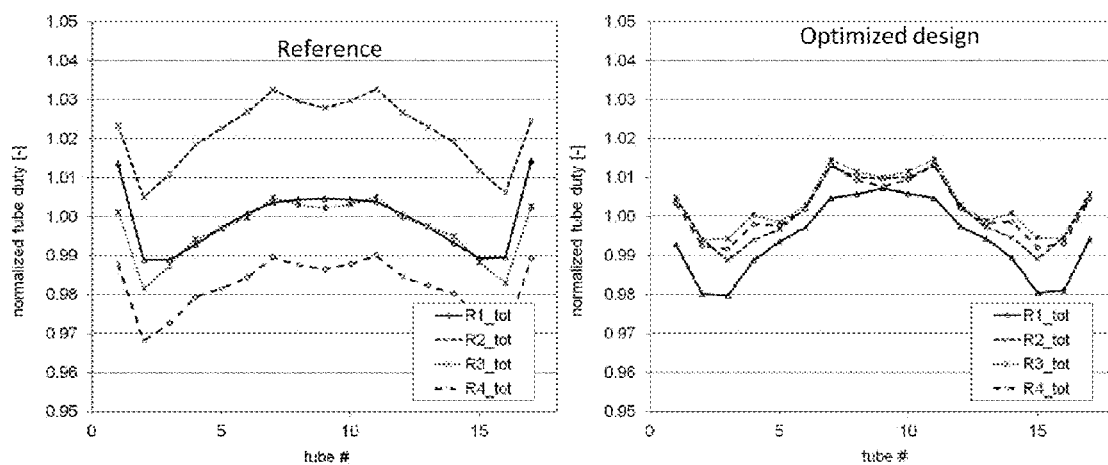
FIG. 7 shows the normalized duty for standard tube bay (17 tubes) in an 8 tube row reformer ((a) actual design (b) optimized design)

The configuration described above has been simulated using the SMR3D simulation tool (Air Liquide proprietary tool based on a Computational Fluid Dynamic (CFD) tool coupled to a reforming tube model). The result of the simulation is presented in FIGS. 6 and 7 and compared to a reference design. The optimized design of the present invention results in a much better duty homogeneity at the reformer scale. The tube duty standard deviation has been decreased and optimized to—row per row—1% vs. 4% in reference case and, as shown in FIG. 7 tube per tube, 3.5% vs. 6.5% in reference case.

FIG. 8a shows the simplest implementation of a burner 3 in combination with a high emissivity refractory layer 7 provided at the inside of the furnace roof 1b. The high emissivity refractory layer 7 may be formed from bricks, thin sheets or a coated layer, wherein the high emissivity results from intrinsic material properties, for instance using SiC sheets, or from surface treatment or texturing, for instance using ceramic foam sheets. A row of reduced power separated jet burners 3 form a continuous flat flame. Compared to the prior art, the proposed innovative implementation uses jet flame burners arranged in a continuous flame with massive number of staged air and fuel injection, e.g. between 10 to 30 fuel injectors per meter, compared to one burner every 2 to 6 meters as proposed in prior art designs.

For the most efficient heat transfer implementation, wall burners 8 can be based on a radial burner technology as shown in FIG. 8b, or in a ramp wall burner technology as shown in FIG. 8c, likely disposed in a staggered way with tubes.

As presented in FIG. 9, also the implementation of swirl ball flame combustion technology associated with a high emissivity layer 7 on the furnace roof 1b is possible. Therein the flame itself is captured in a recirculation zone, when fuel as well as the oxygen source and/or steam is recirculated from a lower point of the flame back into the direction of the furnace roof.

FIG. 10 shows two implementations of the invention using unit cylindrical radiant burners of two possible kinds: FIG. 10a shows a diffusion flame enclosed in a radiating shield 9. Passages 10 to let flue gases enter the flame root by a Venturi effect is recommended to achieve low $NO_x$ amounts. The dilution of the combustion reactants with flue gas will reduce the maximum flame temperature. Both dilution and temperature drops the NOX formation kinetics.

Premixed combustion with flame attachment in a porous form itself is presented in FIG. 10b. The combustion reaction occurs inside the porous media, which is heated up and emits radiation towards the tubes in front of it. The main advantage of this technology is that the radiation could be located at the optimum place regarding heat transfer to tubes.

The radiant shell is made of high temperature resistant material such as porous ceramic foam with high emissivity (SiC, $Al_2O_3$, $ZrO_2$).

The use of radiant burners allows designing the furnace with optimized burner tube to tube pavement that minimizes the circumferential flux inhomogeneities as presented in FIG. 11. Two tube pavements are proposed: FIG. 11a shows a square tube pavement while FIG. 11b shows a hexahedral tube pavement with a standard burner.

FIG. 12 shows the implementation of burners heating the furnace roof 1b itself and uses this roof as a radiant wall. As shown in FIG. 12a, it is possible to design the high insulation, low heat conductivity refractory lining in a convex or as shown in FIG. 12b in a concave form.

FIG. 13 shows different burner configurations which can be implemented in a concave formed burner roof. The cross-section view for two radiating oblique walls 1c is illustrated in FIG. 13a, wherein the optimum angle Ca is below or about 50°, and the horizontal cave roof width Cw is designed based on the tube corridor width W and the Ca angle so that enough space is kept to arrange the burners accordingly.

In FIG. 13b, typical jet burners 3 such as shown in FIG. 8 are disposed in lines to be fired downwards along the oblique radiating walls 1c on each side of the caved roof.

FIG. 13c presents the same kind of design with a continuous linear wall burner.

In FIG. 13d, typical radial wall burners are disposed in the caved roof with spacing L so that the best compromise between heat fluxes homogeneity and burner number reduction is found. It can typically correspond to one burner every 2 to 8 tubes.

Finally, FIG. 13e presents a configuration, where classical high swirl burners are installed in the caved roof.

FIG. 14 shows a convex roof design ("spike roof"). In FIG. 14a, wall burners 3 are arranged around the convex form firing downwards; in FIG. 14b, the burners 3 are arranged inside the convex roof so that the flames are fired upwards from the spike end to increase the radiating area covered by the flames, and thus the transfer efficiency to the tubes 2.

Figures 15A, 15B:
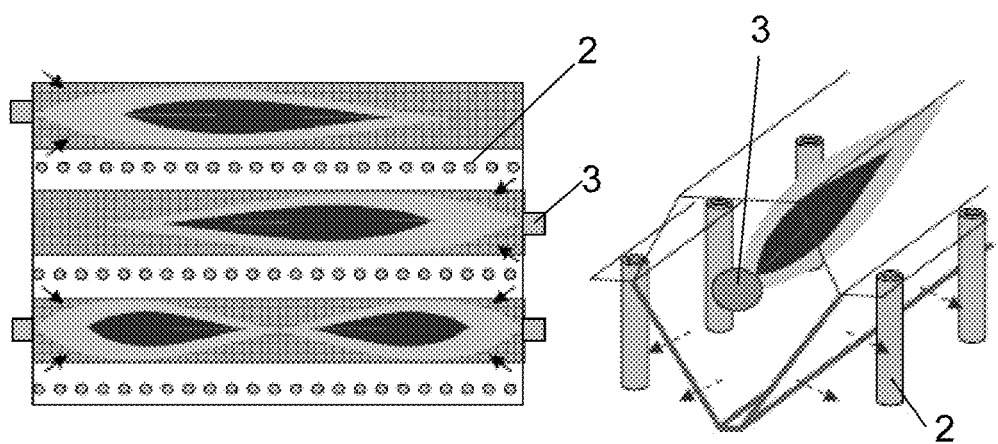
FIG. 15 shows a linear radiant roof burner.

As shown in FIG. 15, it is also possible to provide a porous combustion chamber in which at least one large power burner is fired. Openings close to the flame root (furnace side walls 1a) can be added to let flue gases recirculate from the furnace atmosphere into the gas generator chamber by venturi effect section pressure. The configuration presented in FIG. 15a shows a single burner arrangement with staggered firing from one tube-to-tube-corridor to another. This configuration saves several unit burners capital costs compared to the prior art, where up to 15 or 20 per row are used in large top-fired reformer, and that can be replaced by one or two in the presented embodiment. A more reliable configuration is to have two burners per radiant channel as shown in FIG. 15b so that the furnace performance would be less critically affected in case of burner unaccepted downward.

LIST OF REFERENCE NUMBERS 1 furnace
1a furnace wall
1b furnace roof
1c oblique furnace wall
2 tube
3 burner
3a inner burner
3b outer burner
4 exhaust tunnel
5 middle channel
6 outer channel
7 high emissivity refractory layer
8 wall burner
9 radiating shield
10 passage

The invention claimed is:

1. A furnace for performing an endothermic process comprising tubes containing a catalyst for converting a gaseous feed, wherein said tubes are positioned in inside the furnace, inner burners mounted to a furnace roof between the tubes, and outer burners mounted to the furnace roof between the tubes and a furnace wall, wherein the outer burners are positioned such that the distance of the central axis of each outer burner to the furnace wall is less than 25% of the distance between the outermost tubes and the furnace wall, and that the outer burners are configured to operate with 45-60% of the power of the inner burners and with an inlet velocity between 90 to 110% of the inlet velocity of the inner burners.

2. The furnace according to claim 1, wherein the tubes are positioned in rows and that the ratio of the distance between the furnace wall and the first tube row to the gap between two adjacent tube rows corresponds to the ratio between the power of the outer and the power of the inner burners.

3. The furnace according to claim 1, wherein at least a part of the furnace roof is provided with a temperature resistant, high emissivity solid surface.

4. The furnace according to claim 3, wherein the high emissivity solid surface contains silicon carbide or ceramic porous foams.

5. The furnace according to claim 1, wherein at least some of the burners are jet flame burners.

6. The furnace according to claim 1, wherein at least some of the burners are burners with high swirl ball flame technology.

7. The furnace according to claim 1, wherein at least some of the burners are arranged such that the flame is formed on a porous radiating shield.

8. The furnace according to claim 7, wherein at least some of the burners are arranged in a square or a hexahedral configuration with regard to the catalyst tubes.

9. The furnace according to claim 7, wherein the length of radiating shield is between 10 and 40% of the catalyst containing tube length.

10. The furnace according to claim 1, wherein at least a part of the furnace roof is designed to have a convex or concave shape.

11. A process for operating a furnace for performing an endothermic process with catalyst containing tubes positioned in inside the furnace for converting a gaseous feed and which are heated by inner burners mounted to a furnace roof between the tubes and by outer burners mounted to the furnace roof between the tubes and a furnace wall, wherein the outer burners are positioned such that the distance of the central axis of each outer burner to the furnace wall is less than 25% of the distance between the outermost tubes and the furnace wall, and that the outer burners are operated with 45-60% of the power of the inner burners and that an inlet velocity of the outer burners is adjusted to be between 90 and 110% of the inlet velocity of the inner burners.

12. The process according to claim 11, wherein at least some of the burners' flames are directed from the top to the bottom of the furnace.

13. The process according to claim 11, wherein the feed flows through the vertically arranged catalyst tubes from the top to the bottom of the furnace.

14. The process according to claim 11, wherein the inlet velocity is adjusted by air injection.

15. The process according to claim 11, wherein the endothermic process is a steam reforming process.

* * * * *